United States Patent
Sato et al.

(10) Patent No.: US 11,415,769 B2
(45) Date of Patent: Aug. 16, 2022

(54) INTERMITTENT CONNECTION-TYPE OPTICAL FIBER TAPE CORE WIRE, OPTICAL FIBER CABLE, AND METHOD FOR MANUFACTURING INTERMITTENT CONNECTION-TYPE OPTICAL FIBER TAPE CORE WIRE

(71) Applicant: SUMITOMO ELECTRIC INDUSTRIES, LTD., Osaka (JP)

(72) Inventors: Fumiaki Sato, Osaka (JP); Yoshiaki Nagao, Osaka (JP); Tsuguo Amano, Osaka (JP); Ken Takahashi, Osaka (JP); Noriaki Iwaguchi, Osaka (JP); Katsushi Hamakubo, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/428,893

(22) PCT Filed: Feb. 5, 2020

(86) PCT No.: PCT/JP2020/004373
§ 371 (c)(1),
(2) Date: Aug. 5, 2021

(87) PCT Pub. No.: WO2020/162501
PCT Pub. Date: Aug. 13, 2020

(65) Prior Publication Data
US 2022/0075134 A1   Mar. 10, 2022

(30) Foreign Application Priority Data
Feb. 6, 2019  (JP) .............................. JP2019-019603

(51) Int. Cl.
*G02B 6/44*  (2006.01)
(52) U.S. Cl.
CPC .................................... *G02B 6/448* (2013.01)
(58) Field of Classification Search
CPC ...................................................... G02B 6/448
(Continued)

(56) References Cited

U.S. PATENT DOCUMENTS

| 5,182,786 A | 1/1993 | Kinaga et al. |
| 2008/0102262 A1 | 5/2008 | Esaki et al. |

(Continued)

FOREIGN PATENT DOCUMENTS

| EP | 3404462 A1 | 11/2018 |
| JP | H02-170867 A | 7/1990 |

(Continued)

*Primary Examiner* — Jerry M Blevins
(74) *Attorney, Agent, or Firm* — Faegre Drinker Biddle & Reath LLP

(57) ABSTRACT

Provided is an intermittently coupled-type optical fiber ribbon in which, in a state where a plurality of optical fibers are arranged in parallel, coupling portions at which adjacent optical fibers are coupled by a coupling resin and non-coupling portions at which the adjacent optical fibers are not coupled are intermittently provided in a longitudinal direction, the coupling portions and the on-coupling portions being provided between some or all of the plurality of optical fibers, in which at least some of the non-coupling portions include a convex portion of the coupling resin, a tip end of the convex portion having an acute angle in a cross-sectional view in a direction orthogonal to the longitudinal direction.

9 Claims, 6 Drawing Sheets

(58) Field of Classification Search
USPC .......................................................... 385/114
See application file for complete search history.

(56) References Cited

U.S. PATENT DOCUMENTS

| | | | |
|---|---|---|---|
| 2015/0030296 A1* | 1/2015 | Sakabe | G02B 6/4495 |
| | | | 385/114 |
| 2016/0070079 A1* | 3/2016 | Saji | G02B 6/4495 |
| | | | 385/114 |
| 2016/0161692 A1 | 6/2016 | Namazue et al. | |
| 2017/0090135 A1 | 3/2017 | Sato et al. | |
| 2017/0115461 A1 | 4/2017 | Namazue et al. | |
| 2017/0184803 A1 | 6/2017 | Namazue et al. | |
| 2017/0266094 A1 | 9/2017 | Gebert-Schwarzwaelder et al. | |
| 2019/0250347 A1 | 8/2019 | Fallahmohammadi et al. | |
| 2020/0218020 A1 | 6/2020 | Namazue et al. | |

FOREIGN PATENT DOCUMENTS

| | | | |
|---|---|---|---|
| JP | 2004-206048 | A | 7/2004 |
| JP | 2005-213453 | A | 8/2005 |
| JP | 2006-188659 | A | 7/2006 |
| JP | 2007-131698 | A | 5/2007 |
| JP | 2012-108331 | A | 6/2012 |
| JP | 2012-208310 | A | 10/2012 |
| JP | 2013-088617 | A | 5/2013 |
| JP | 2014-117800 | A | 6/2014 |
| JP | 2015-108756 | A | 6/2015 |
| JP | 2017-062431 | A | 3/2017 |
| JP | 2018-526687 | | 9/2018 |
| JP | 2019-049617 | A | 3/2019 |
| WO | WO-2004-042446 | A1 | 5/2004 |
| WO | WO-2016-083012 | A1 | 6/2016 |
| WO | WO-2017-023516 | A1 | 2/2017 |

* cited by examiner

INTERMITTENT CONNECTION-TYPE OPTICAL FIBER TAPE CORE WIRE, OPTICAL FIBER CABLE, AND METHOD FOR MANUFACTURING INTERMITTENT CONNECTION-TYPE OPTICAL FIBER TAPE CORE WIRE

TECHNICAL FIELD

The present disclosure relates to an intermittently coupled-type optical fiber ribbon, an optical fiber cable, and a method for manufacturing an intermittently coupled-type optical fiber ribbon.

The present application claims priority from Japanese Patent Application No. 2019-019603 filed on Feb. 6, 2019, contents of which are incorporated by reference in its entirety.

BACKGROUND ART

Patent Literature 1 describes an optical fiber ribbon which is not an intermittently coupled-type. In the optical fiber ribbon, a plurality of optical fibers are arranged in parallel and are integrated by a sheath over the entire outer circumference of the arranged optical fibers and over the entire length of the optical fibers.

Patent Literature 2 describes an intermittently coupled-type optical fiber ribbon in which a coupling resin is intermittently filled in the circumferential direction of optical fibers.

Patent Literature 3 describes an intermittently coupled-type optical fiber ribbon in which a coupling portion is broken in a state where a colored layer adheres to the coupling portion to be separated into single optical fibers.

Patent Literature 4 describes an intermittently coupled-type optical fiber ribbon in which a distance between centers of adjacent optical fibers is set to 250±30 μm by using small-diameter optical fibers having an outer diameter of 220 μm or less.

CITATION LIST

Patent Literature

Patent Literature 1: JP-2004-206048-A
Patent Literature 2: JP-2014-117800-A
Patent Literature 3: WO 2016/083012 A1
Patent Literature 4: JP-2013-88617-A

SUMMARY OF INVENTION

According to an aspect of the present disclosure, there is provided an intermittently coupled-type optical fiber ribbon in which, in a state where a plurality of optical fibers are arranged in parallel, coupling portions at which adjacent optical fibers are coupled by a coupling resin and non-coupling portions at which the adjacent optical fibers are not coupled are intermittently provided in a longitudinal direction, the coupling portions and the non-coupling portions being provided between some or all of the plurality of optical fibers, in which at least some of the non-coupling portions include a convex portion of the coupling resin, a tip end of the convex portion having an acute angle in a cross-sectional view in a direction orthogonal to the longitudinal direction.

According to an aspect of the present disclosure, there is provided an optical fiber cable in which the intermittently coupled-type optical fiber ribbon described above is installed, in which a fiber density of the optical fiber cable obtained by dividing the number of optical fibers by a cable cross-sectional area is 4.5 fibers/mm$^2$ or more.

According to an aspect of the present disclosure, there is provided a method for manufacturing an intermittently coupled-type optical fiber ribbon in which, in a state where a plurality of optical fibers are arranged in parallel, coupling portions at which adjacent optical fibers are coupled by a coupling resin and non-coupling portions at which the adjacent optical fibers are not coupled are intermittently provided in a longitudinal direction, the coupling portions and the non-coupling portions being provided between some or all of the plurality of optical fibers, the method including:

a step of forming the coupling portions by coating the plurality of optical fibers arranged in parallel with the coupling resin; and a step of forming the non-coupling portions by intermittently, in a longitudinal direction, pressing the coupling resin between the optical fibers with a pressing member having a sharp tip end so as to break at least a part of the coupling resin in such a way that a tip end of a broken surface where the coupling resin is broken becomes a convex portion having an acute angle in a cross-sectional view in a direction orthogonal to the longitudinal direction.

DESCRIPTION OF EMBODIMENTS

Technical Problem

Figure 1:
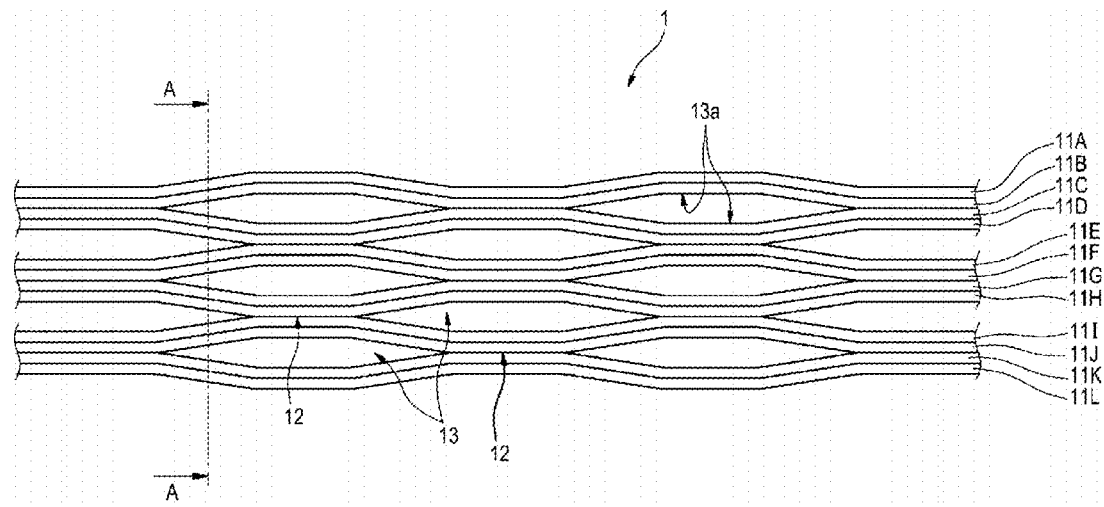
FIG. 1 shows an example of an intermittently coupled-type optical fiber ribbon according to an embodiment.

An optical fiber ribbon which not an intermittently coupled-type as in Patent Literature 1 is difficult to be separated into single optical fibers as compared with an intermittently coupled-type optical fiber ribbon. In the intermittently coupled-type optical fiber ribbons described in Patent Literatures 2 and 3, a resin is filled in the circumferential direction of optical fibers even at non-coupling portions, and the adhesion between a colored layer and a coupling resin layer is strong. As a result, the intermittently coupled-type optical fiber ribbons may be difficult to be separated into single optical fibers.

Patent Literature 4 describes an intermittently coupled-type optical fiber ribbon using small-diameter optical fibers having an outer diameter of 220 μm or less. When the optical fibers have a small diameter, a coating layer is thin and the lateral pressure resistance is weak. In such intermittently coupled-type optical fiber ribbons including small-diameter optical fibers, the transmission loss may increase when adjacent intermittently coupled-type optical fiber ribbons come into close contact and lateral pressure is applied to the intermittently coupled-type optical fiber ribbons, for example, when the intermittently coupled-type optical fiber ribbons are accommodated in an optical fiber cable.

An object of the present disclosure is to provide an intermittently coupled-type optical fiber ribbon, an optical fiber cable, and a method for manufacturing an intermittently coupled-type optical fiber ribbon, in which the intermittently coupled-type optical fiber ribbon can be easily separated into single optical fibers.

Advantageous Effects of Disclosure

According to the present disclosure, it is possible to provide an intermittently coupled-type optical fiber ribbon, an optical fiber cable, and a method for manufacturing an intermittently coupled-type optical fiber ribbon, in which the intermittently coupled-type optical fiber ribbon can be easily separated into single optical fibers.

DESCRIPTION OF EMBODIMENTS OF DISCLOSURE

First, aspects of the present disclosure will be listed and described.

According to an aspect of the present disclosure, there is provided:

(1) an intermittently coupled-type optical fiber ribbon in which, in a state where a plurality of optical fibers are arranged in parallel, coupling portions at which adjacent optical fibers are coupled by a coupling resin and non-coupling portions at which the adjacent optical fibers are not coupled are intermittently provided in a longitudinal direction, the coupling portions and the non-coupling portions being provided between some or all of the plurality of optical fibers, in which at least some of the non-coupling portions include a convex portion of the coupling resin, a tip end of the convex portion having an acute angle in a cross-sectional view in a direction orthogonal to the longitudinal direction.

The intermittently coupled-type optical fiber ribbon includes the convex portion of the coupling resin in at least some of the non-coupling portion of the intermittent structure. The convex portion includes the tip end having an acute angle in the cross-sectional view in the direction orthogonal to the longitudinal direction. When the convex portion is pulled by, for example, a finger, the coupling resin can be easily peeled off from the intermittently coupled-type optical fiber ribbon. When the coupling resin is peeled off in this way, the intermittently coupled-type optical fiber ribbon is separated into single optical fibers. Therefore, the intermittently coupled-type optical fiber ribbon can be easily sepa-rated into single optical fibers without cutting or removing the coupling resin of the coupling portion with a tool or the like.

(2) An outer diameter of the optical fiber may be 160 μm or more and 220 μm or less. Even an intermittently coupled-type optical fiber ribbon using small-diameter optical fibers having an outer diameter of 160 μm or more and 220 μm or less can be easily separated into single optical fibers.

(3) The optical fiber may include a glass fiber, a coating layer covering a circumference of the glass fiber, and a colored layer covering a circumference of the coating layer, and at least at a part of the non-coupling portion, the colored layer may be exposed.

Since the colored layer is exposed at the non-coupling portion, the coupling resin can be easily peeled off.

(4) A Young's modulus of the coupling resin may be 1200 MPa or less at 23° C.

For example, in a case where intermittently coupled-type optical fiber ribbons are gathered to be rounded and accommodated in an optical fiber cable, the convex portion is pressed against the optical fiber and transmission loss due to microbend may increase. However, the intermittently coupled-type optical fiber ribbon is soft when the Young's modulus of the coupling resin at 23° C. is 1200 MPa or less. Accordingly, an increase in the transmission loss can be prevented even when the convex portion is pressed.

(5) A breaking elongation of the coupling resin may be 150% or less at 23° C.

When the breaking elongation of the coupling resin is large, it is difficult to break the coupling resin. However, in the intermittently coupled-type optical fiber ribbon, the breaking elongation of the coupling resin at 23° C. is 150% or less. Accordingly, it is easy to break the coupling resin to form the non-coupling portion at the time of manufacturing, and the intermittent workability is good.

(6) A minimum coating thickness from a surface of the coupling resin to a surface of the optical fiber may be 10 μm or less.

Since the minimum coating thickness of the coupling resin is 10 μm or less and the coating thickness is small, it is easy to break the coupling resin at the time of intermittent processing.

(7) The optical fiber may include two coating layers, an outer coating layer of the two coating layers may be a cured product of a resin composition containing:

a base resin containing a urethane acrylate oligomer or a urethane methacrylate oligomer, a monomer having a phenoxy group, a photopolymerization initiator, and a silane coupling agent; and hydrophobic inorganic oxide particles, and a content of the inorganic oxide particles in the resin composition may be 1% by mass or more and 45% by mass or less based on a total amount of the resin composition.

When the resin as described above is used as the outer coating layer of the two coating layers of the optical fiber, the lateral pressure resistance of the optical fiber is increased. When the intermittently coupled-type optical fiber ribbon is constituted by such optical fibers, an increase in the transmission loss when the intermittently coupled-type optical fiber ribbon is accommodated in an optical fiber cable can be prevented, and thus the intermittently coupled-type optical fiber ribbon can be accommodated in the optical fiber cable at a high density.

According to an aspect of the present disclosure, there is provided:

(8) an optical fiber cable in which the intermittently coupled-type optical fiber ribbon according to any one of (1) to (7) is installed, in which a fiber density of the optical fiber cable obtained by dividing the number of optical fibers by a cable cross-sectional area is 4.5 fibers/mm² or more.

According to the above configuration, since the optical fiber cable has a fiber density of 4.5 fibers/mm² or more, the optical fibers can be installed at a high density. Even the optical fiber cable in which intermittently coupled-type optical fiber ribbons are accommodated at a high density can be easily separated into single optical fibers.

According to an aspect of the present disclosure, there is provided:

(9) a method for manufacturing an intermittently coupled-type optical fiber ribbon in which, in a state where a plurality of optical fibers are arranged in parallel, coupling portions at which adjacent optical fibers are coupled by a coupling resin and non-coupling portions at which the adjacent optical fibers are not coupled are intermittently provided in a longitudinal direction, the coupling portions and the non-coupling portions being provided between some or all of the plurality of optical fibers, the method including:

a step of forming the coupling portions by coating the plurality of optical fibers arranged in parallel with the coupling resin; and a step of forming the non-coupling portions by intermittently, in a longitudinal direction, pressing the coupling resin between the optical fibers with a pressing member having a sharp tip end so as to break at least a part of the coupling resin in such a way that a tip end of a broken surface where the coupling resin is broken becomes a convex portion having an acute angle in a cross-sectional view in a direction orthogonal to the longitudinal direction.

According to the above-described method for manufacturing an intermittently coupled-type optical fiber ribbon, in the step of forming the non-coupling portion, the tip end of the broken surface where the coupling resin is broken becomes a convex portion having an acute angle in a cross-sectional view in a direction orthogonal to the longitudinal direction. When the convex portion is pulled by, for example, a finger, the coupling resin can be easily peeled off from the intermittently coupled-type optical fiber ribbon. When the coupling resin is peeled off in this way, the intermittently coupled-type optical fiber ribbon is separated into single optical fibers. Therefore, it is possible to manufacture an intermittently coupled-type optical fiber ribbon that can be easily separated into single optical fibers without cutting or removing the coupling resin of the coupling portion with a tool or the like.

Details of Embodiments of Disclosure

Specific examples of the intermittently coupled-type optical fiber ribbon, the optical fiber cable, and the method for manufacturing an intermittently coupled-type optical fiber ribbon according to an embodiment of the present disclosure will be described below with reference to the drawings.

The present disclosure is not limited to these examples but is disclosed by the scope of the claims, and is intended to include all modifications within meanings and scopes equivalent to the claims.

FIG. 1 is a plan view showing an example of the intermittently coupled-type optical fiber ribbon according to the embodiment. FIG. 1 shows an intermittently coupled-type optical fiber ribbon 1 (hereinafter, referred to as the optical fiber ribbon 1) in a state where non-coupling portions 13 are expanded in the arrangement direction of optical fibers 11A to 11L.

As shown in FIG. 1, the optical fiber ribbon 1 includes a plurality of optical fibers 11 arranged in parallel. In this example, twelve optical fibers 11A to 11L are arranged in parallel. The twelve optical fibers 11A to 11L are coupled by a coupling resin in such a way that at least a part of an optical fiber is in contact with at least a part of an adjacent optical fiber.

The optical fiber ribbon 1 is an intermittently coupled-type optical fiber ribbon including, at every other two optical fibers, coupling portions 12 at which optical fibers are coupled by a coupling resin and the non-coupling portions 13 at which the optical fibers are not coupled by a coupling resin. The coupling portions 12 and the non-coupling portions 13 are intermittently provided in the longitudinal direction of the optical fibers. In the optical fiber ribbon 1, the coupling portions 12 and the non-coupling portions 13 are provided between the optical fibers 11B, 11C, between the optical fibers 11D, 11E, between the optical fibers 11F, 11G, between the optical fibers 11H, 11I, and between the optical fibers 11J, 11K.

This example shows an intermittently coupled-type optical fiber ribbon including twelve optical fibers, but the number of optical fibers is not limited to twelve. The number of optical fibers may be twelve or more as long as the number is a multiple of four. For example, the number of optical fibers may be 16, 20, 24, . . . , and 96.

Figure 2:
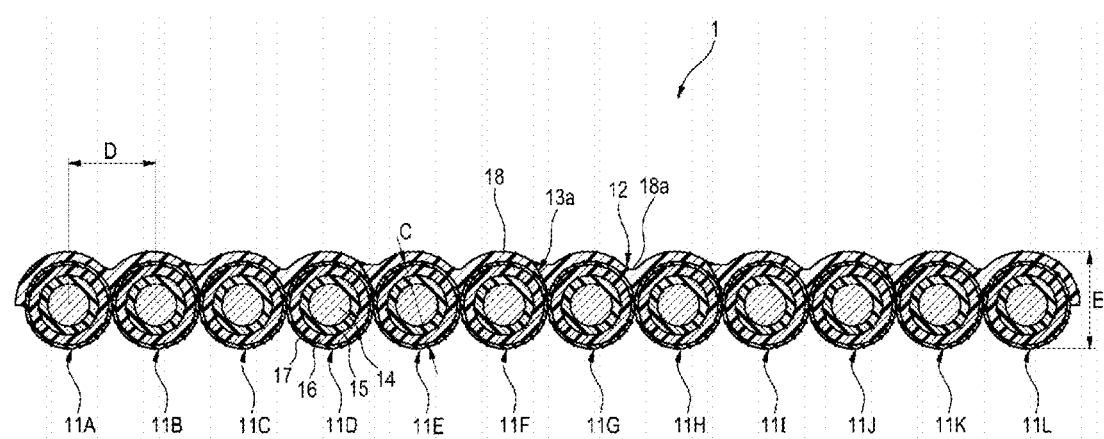
FIG. 2 is a cross-sectional view (a state in which non-coupling portions are closed) of the intermittently coupled-type optical fiber ribbon in FIG. 1 taken along a line A-A in a case where a coupling resin is coated on only one surface of the optical fiber ribbon.
Figure 3:
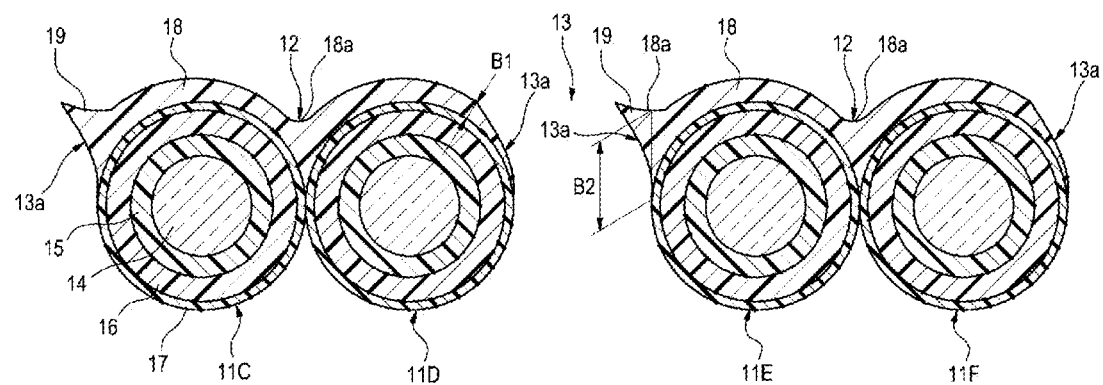
FIG. 3 is an enlarged view of the vicinity of the non-coupling portions of the intermittently coupled-type optical fiber ribbon of FIG. 2.

FIG. 2 is a cross-sectional view of the optical fiber ribbon 1 in FIG. 1 taken from a line A-A in a case where a coupling resin 18 is coated on only one surface of the optical fiber ribbon 1. FIG. 3 is an enlarged view of the vicinity of the non-coupling portions 13 of the optical fiber ribbon 1 of FIG. 2, and shows a state in which the non-coupling portions 13 (space between the optical fibers) are closed.

As shown in FIGS. 2 and 3, each of the optical fibers 11 includes, for example, a glass fiber 14 including a core and a cladding, two coating layers 15, 16 covering the circumference of the glass fiber 14, and a colored layer 17 covering the circumference of the coating layers 15, 16. The inner coating layer 15 of the two coating layers is formed of a primary resin. The outer coating layer 16 of the two coating layers is formed of a secondary resin.

For the primary resin constituting the inner coating layer 15 in contact with the glass fiber 14, a soft resin having a relatively small Young's modulus is used as a buffer layer. For the secondary resin constituting the outer coating layer 16, a hard resin having a relatively large Young's modulus is used as a protective layer. For example, the secondary resin has a Young's modulus of 900 MPa or more, preferably 1000 MPa or more, and more preferably 1500 MPa or more at 23° C.

The secondary resin constituting the outer coating layer 16 is a resin composition containing a base resin and hydrophobic inorganic oxide particles. The base resin contains a urethane acrylate oligomer or a urethane methacrylate oligomer, a monomer having a phenoxy group, a photopolymerization initiator, and a silane coupling agent. The content of the inorganic oxide particles in the resin composition is 1% by mass or more and 45% by mass or less based on the total amount of the resin composition.

Hereinafter, acrylate or methacrylate corresponding to acrylate is referred to as (meth)acrylate.

As the urethane (meth)acrylate oligomer, an oligomer obtained by reacting a polyol compound, a polyisocyanate compound, and a hydroxyl group-containing (meth)acrylate compound can be used. The oligomer is obtained by, for example, reacting polypropylene glycol having a molecular weight of 4,000, isophorone diisocyanate, hydroxyethyl acrylate, and methanol.

As the monomer having a phenoxy group, a phenoxy group-containing (meth)acrylate compound can be used. An example of the monomer having a phenoxy group includes nonylphenol EO-modified acrylate (trade name "Aronix M-113" manufactured by Toagosei Co., Ltd.).

The photopolymerization initiator can be appropriately selected and used from known radical photopolymerization initiators. For example, the photopolymerization initiator is 2,4,6-trimethylbenzoyldiphenylphosphine oxide.

The silane coupling agent is not particularly limited as long as it does not hinder the curing of the resin composition. An example of the silane coupling agent includes 3-mercaptopropyltrimethoxysilane.

The hydrophobic inorganic oxide particles are obtained by introducing a hydrophobic group into surfaces of the inorganic oxide particles. The inorganic oxide particles are, for example, silica particles. The hydrophobic group may be a reactive group such as a (meth)acryloyl group or a vinyl group, or a non-reactive group such as a hydrocarbon group (for example, an alkyl group) or an aryl group (for example, a phenyl group).

By blending the inorganic oxide particles into the secondary resin constituting the outer coating layer 16, the lateral pressure characteristics of the optical fibers 11 are improved. The primary resin constituting the inner coating layer 15 and the secondary resin constituting the outer coating layer 16 are formed of, for example, an ultraviolet curable resin and a thermosetting resin. The optical fibers 11 have a bending loss of 0.25 dB/10 turns or less when the bending radius R is 15 mm.

In the optical fiber ribbon 1, the coupling resin 18 that couples adjacent optical fiber cores 11A to 11L is coated on only one side (upper side in FIGS. 2 and 3) of the optical fibers 11A to 11L arranged in parallel when viewed from a direction perpendicular to the parallel direction (vertical direction in FIGS. 2 and 3). The coupling resin 18 is coated in a shape including concave portions 18a between optical fibers corresponding to recesses between adjacent optical fibers. In the coupling resin 18, the coupling portions 12 and the non-coupling portions 13 are intermittently provided in the longitudinal direction every other two optical fibers as described above. The coupling portions 12 and the non-coupling portions 13 are intermittently coupled by the coupling resin 18. For the coupling resin 18, for example, an ultraviolet curable resin and a thermosetting resin can be used.

As shown in FIGS. 1 to 3, the non-coupling portions 13 of the optical fiber ribbon 1 are formed with broken surfaces 13a penetrating upper and lower surfaces of the optical fiber ribbon 1 relative to the coupling resin 18. Such broken surfaces 13a are formed by the breakage of the coupling resin 18 provided between the optical fibers.

FIG. 3 shows the enlarged optical fibers 11C to 11F in a state where the non-coupling portion 13 between the optical fibers 11D, 11E is expanded in the arrangement direction. As shown in FIG. 3, the broken surfaces 13a at the non-coupling portion 13 are obtained by the coupling resin 18 being broken in an oblique direction (from the upper left to the lower right in FIG. 3).

Positions where the broken surfaces 13a are formed in the coupling resin 18 (positions where the breakage of the coupling resin 18 is started) are positions deviated from central positions of the concave portions 18a in the alignment direction of the optical fibers. When the thickness of the coupling resin 18 in the positions where the broken surfaces 13a are formed is set to a coating thickness B1 and the thickness of the coupling resin 18 in the concave portions 18a of the coupling resin 18 is set to a coating thickness B2, the coating thickness B1 is smaller than the coating thickness B2. That is, the broken surfaces 13a start from a part where the coating thickness of the coupling resin 18 is small. The coating thickness of the coupling resin 18 is large (coating thickness B2) in the central positions of the concave portions 18a, and is substantially the same (coating thickness B1) in the rest of the parts.

Since the coupling resin 18 at the non-coupling portions 13 where the broken surfaces 13a are formed is broken from a part where the thickness of the coupling resin 18 is small, tip end portions of the broken surfaces 13a are formed into convex portions 19 having an acute angle in a cross-sectional view in the direction orthogonal to the longitudinal direction of the optical fiber ribbon 1. The colored layer 17 is exposed at least at a part of the optical fibers 11 at the non-coupling portions 13. The coupling resin 18 has a Young's modulus of 1200 MPa or less, and preferably 500 MPa or less at room temperature (for example, 23° C.). The breaking elongation of the coupling resin 18 is 150% or less at room temperature (for example, 23° C.).

The optical fibers 11A to 11L having the above configuration have an outer diameter C (see FIG. 2) of 220 μm or less. A distance D between centers of adjacent optical fibers in the optical fibers 11A to 11L is 230 μm or less. The optical fiber ribbon 1 has a thickness E of 230 μm or less when the coupling resin 18 is coated on surfaces of only one side of the optical fibers. The minimum coating thickness of the coupling resin 18 is the coating thickness B1 (see FIG. 3), and the thickness is 10 μm or less.

In the example shown in FIGS. 2 and 3, although the optical fiber ribbon 1 is configured in such a way that the optical fibers 11A to 11L are arranged in parallel in a state of being in contact with each other and surfaces on only one side of the optical fibers 11 are coated with the coupling resin 18, the present disclosure is not limited thereto.

Figure 4:
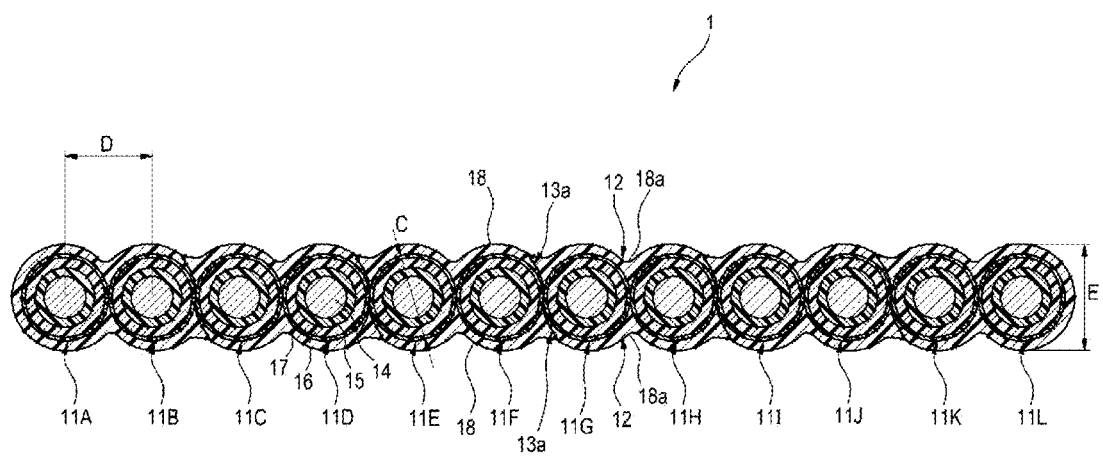
FIG. 4 is a cross-sectional view (a state in which non-coupling portions are closed) of the intermittently coupled-type optical fiber ribbon in FIG. 1 taken along the line A-A in a case where the coupling resin is coated on both surfaces.
Figure 5:
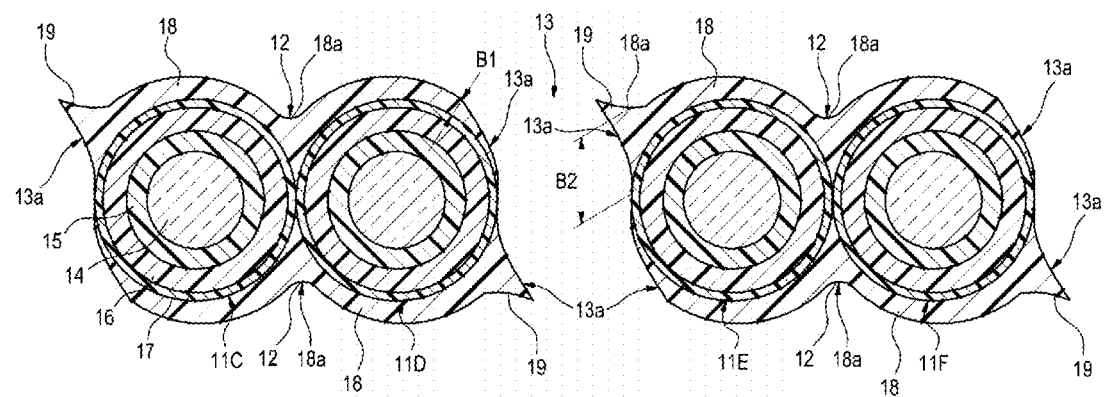
FIG. 5 is an enlarged view of the vicinity of the non-coupling portions of the intermittently coupled-type optical fiber ribbon of FIG. 4.

For example, as shown in FIGS. 4 and 5, the optical fibers 11A to 11L may be coupled by coating surfaces on both sides of the optical fibers 11A to 11L arranged in parallel with the coupling resin 18.

FIG. 4 is a cross-sectional view of the optical fiber ribbon 1 in FIG. 1 taken along the line A-A in a case where the coupling resin 18 is coated on both surfaces of the optical fiber ribbon 1, and shows a state in which the non-coupling portions 13 (space between the optical fibers) are closed. FIG. 5 is an enlarged view of the vicinity of the non-coupling portions 13 of the optical fiber ribbon 1 of FIG. 4.

As shown in FIGS. 4 and 5, when the coupling resin 18 is coated on both surfaces of the optical fiber ribbon 1, the convex portions 19 are formed on both the surfaces, and the thickness E of the optical fiber ribbon 1 is 240 μm or less.

For example, the optical fibers 11A to 11L may be arranged in parallel in a state where a slight gap exists between adjacent optical fibers, and the optical fibers 11A to 11L may be coated and coupled in a state where the coupling resin 18 enters the gap between the optical fibers.

Figure 6:
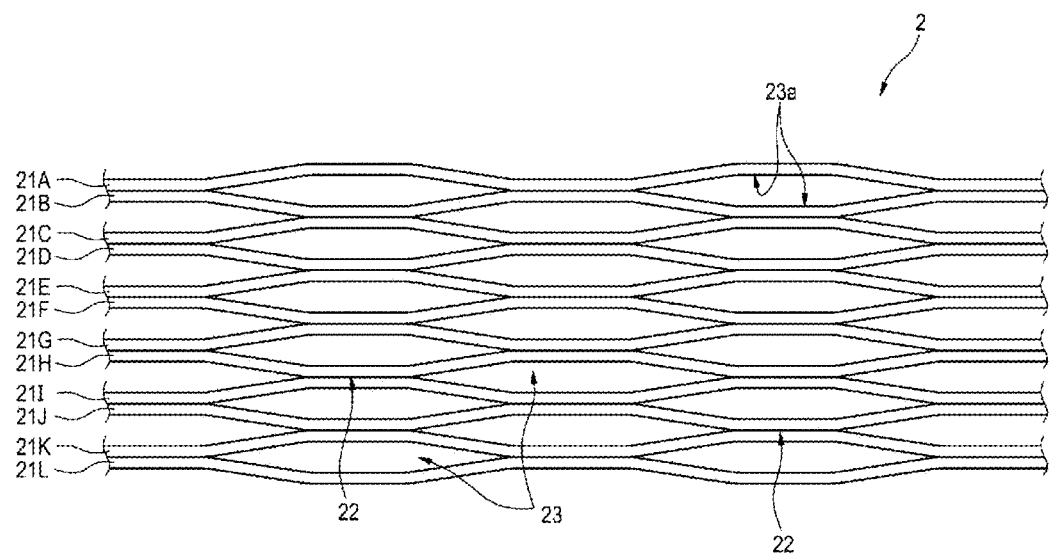
FIG. 6 shows another example of an intermittently coupled-type optical fiber ribbon.

FIG. 6 shows another example of the intermittently coupled-type optical fiber ribbon according to the present embodiment. As shown in FIG. 6, an intermittently coupled-type optical fiber ribbon 2 (hereinafter, referred to as the optical fiber ribbon 2) of this example is different from the optical fiber ribbon 1 of FIG. 1, in which the coupling portions 12 and the non-coupling portions 13 are provided every other two optical fibers, in that coupling portions 22 and non-coupling portions 23 are provided between all optical fibers. The non-coupling portions 23 are formed with break surfaces 23a corresponding to the broken surfaces 13a of the non-coupling portions 13 in the optical fiber ribbon 1 of FIG. 1.

The optical fiber ribbon 2 includes twelve optical fibers 21 (21A to 21L in this example), and the number of optical fibers is the same as that of the optical fiber ribbon 1 in FIG. 1. Other configurations, for example, glass fibers and coating layers forming the optical fibers, the coating thickness B of the coupling resin, the outer diameter C of the optical fibers, the distance D between centers of the optical fibers, the thickness E of the optical fiber ribbon, and the bending loss of the optical fibers are the same as those of the optical fiber ribbon 1 of FIG. 1. Also in the optical fiber ribbon 2, the surface on which the coupling resin 18 is coated may be one surface or both surfaces.

Next, a method for manufacturing the optical fiber ribbon 1 will be described.

When viewed from a direction perpendicular to the direction in which the optical fibers are arranged in parallel, the coupling resin 18 is coated on one side of the optical fibers 11A to 11L arranged in parallel in a state where at least a part of an optical fiber is in contact with at least a part of an adjacent optical fiber. The coupling resin 18 is coated to form the concave portions 18a between the optical fibers so that the cross section between the optical fibers has a recessed shape. By coating the coupling resin 18, the coupling portions 12 that couple adjacent optical fibers are formed.

Figure 7:
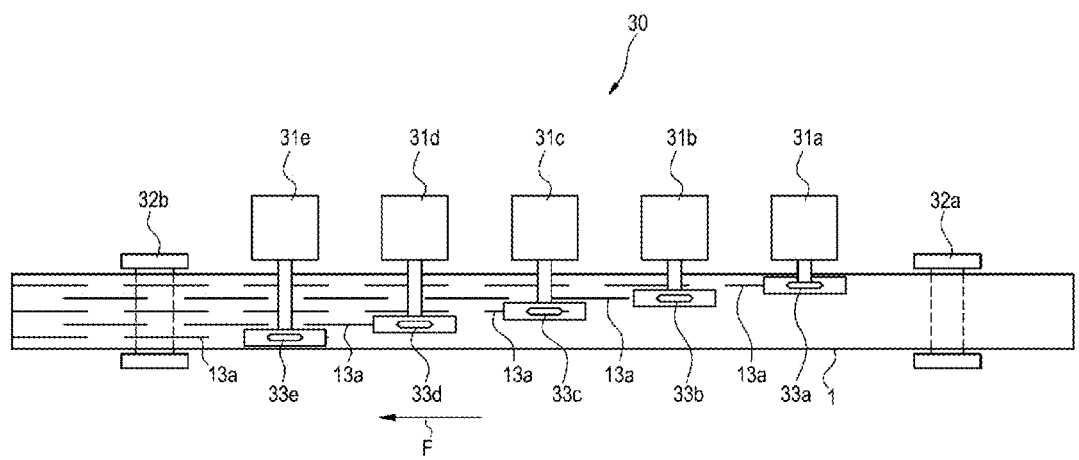
FIG. 7 shows a method for manufacturing an intermittently coupled-type optical fiber ribbon according to the present embodiment.

Subsequently, the non-coupling portions 13 are formed by breaking the coated coupling resin 18. FIG. 7 shows an example of a non-coupling portion forming device 30 that forms the non-coupling portions 13 in the optical fiber ribbon 1. The optical fiber ribbon 1 coated with the coupling resin 18 is caused to run on the non-coupling portion forming device 30. In FIG. 7, it is assumed that the optical fiber ribbon 1 runs from right to left (in the direction of an arrow F) through a pass line of the non-coupling portion forming device 30. Since the optical fiber ribbon 1 includes twelve optical fibers 11A to 11L and the non-coupling portions 13 are formed every other two optical fibers, five breaking mechanisms 31a to 31e are prepared. In a case where the non-coupling portions 23 are formed in the optical fiber ribbon 2 of FIG. 6, the non-coupling portions 23 are formed for each optical fiber, and thus eleven breaking mechanisms are prepared.

The breaking mechanisms 31a to 31e stagger, for example, between guide rollers 32a, 32b that guide the running of the optical fiber ribbon 1 in the pass line direction of the non-coupling portion forming device 30 (the longitudinal direction of the optical fiber ribbon 1). The breaking mechanisms 31a to 31e respectively include pressing members 33a to 33e having sharp tip ends. In the non-coupling portion forming device 30, the pressing members 33a to 33e are abutted against the concave portions 18a of the coupling resin 18 between predetermined optical fibers of the optical fibers 11A to 11L from the side of the optical fiber ribbon 1 on which the coupling resin 18 is coated and apply a pressing force to the concave portions 18a. Due to the pressing force, a force acts to pull the coupling resin 18 toward locations against which the tip ends of the pressing members 33a to 33e abut. Due to this pulling force, the coupling resin 18 is broken to be torn off starting from a part where the coating thickness of the coupling resin is smaller than the coating thickness of the coupling resin at the concave portions 18a (for example, a part of the coating thickness B1 shown in FIG. 3). As a result, as shown in FIG. 3, the tip ends of the broken surfaces 13a of the coupling resin 18 become the convex portions 19 having an acute angle in a cross-sectional view in a direction orthogonal to the longitudinal direction of the optical fiber ribbon 1.

The "pressing members having sharp tip ends" have, for example, a certain degree of a small area in contact with the coupling resin 18 and can apply a pressing force to the coupling resin 18, and thus may be members that can break the coupling resin 18 as described above. For example, cutter blades, thin plate-shaped members, and needle-shaped members can be used as the pressing members 33a to 33e.

As a result, the coupling resin 18 between the optical fibers 11 is intermittently broken in the longitudinal direction of the optical fibers 11, and parts where the broken surfaces 13a are formed are the non-coupling portions 13 as shown in FIGS. 1 and 3. By changing positions between the optical fibers 11 against which the pressing members 33a to 33e are pressed and changing pressing patterns, it is possible to manufacture an intermittently coupled-type optical fiber ribbon having other patterns.

In this way, the intermittently coupled-type optical fiber ribbon 1 is manufactured, and the manufactured optical fiber ribbon 1 is wound by a winding bobbin.

The optical fiber ribbon 2 can be manufactured by the same manufacturing method as that of the optical fiber ribbon 1 by changing the number of breaking mechanisms or the like.

The above-described intermittently coupled-type optical fiber ribbon 1 (2) has the convex portions 19 of the coupling resin 18 in the non-coupling portions 13 (23) of the intermittent structure. The convex portions 19 include tip ends having an acute angle in the cross-sectional view in the direction orthogonal to the longitudinal direction. For this reason, when the convex portions 19 are pinched and pulled by, for example, a finger, the coupling resin 18 can be easily peeled off from the optical fiber ribbon 1 (2). When the coupling resin 18 is peeled off in this way, the optical fiber ribbon 1 (2) is separated into every two (single) optical fibers 11 (21). Therefore, in the intermittently coupled-type optical fiber ribbon 1 (2), the optical fibers 11 can be easily separated into single optical fibers without cutting or removing the coupling resin 18 of the coupling portions 12 (22) with a tool or the like.

In addition, when the optical fiber ribbon 1 (2) is aligned again after being intermittently broken, the convex portions 19 and the concave portions of the coupling resin 18 in the non-coupling portions 13 (23) are combined and the non-coupling portions 13 (23) have substantially the same shape as the coupling portions 12 (22). For this reason, the optical fiber ribbon 1 (2) can be aligned in the width direction without unevenness due to steps. As a result, when the optical fiber ribbons 1 (2) are collectively fusion-spliced, the alignability of the optical fiber ribbons 1 (2) in the width direction can be improved, the fusion-splicing workability is good, and a splicing error can be less likely to occur.

According to the optical fiber ribbon 1 (2), the optical fibers 11 can be easily separated into single optical fibers even when the small-diameter optical fibers 11 having an outer diameter of 220 µm or less are used.

According to the optical fiber ribbon 1 (2), the coupling resin 18 can be easily peeled off since the non-coupling portions 13 (23) have a part where the colored layer 17 is exposed.

When the coupling resin 18 in the non-coupling portions 13 has the convex portions 19, for example, in a case where the optical fiber ribbons 1 (2) are gathered to be rounded and accommodated in an optical fiber cable, the convex portions 19 are pressed against the optical fibers 11 and transmission loss due to microbend may increase. However, the optical fiber ribbon 1 (2) is soft when the Young's modulus of the coupling resin 18 at room temperature is 1200 MPa or less. Accordingly, an increase in the transmission loss can be prevented even when the convex portions 19 are pressed.

When the breaking elongation of the coupling resin 18 is large, it is difficult to break the coupling resin 18. However, in the optical fiber ribbon 1 (2), the breaking elongation of the coupling resin 18 at normal temperature is 150% or less. Accordingly, it is easy to break the coupling resin 18 to form the non-coupling portions 13 at the time of manufacturing and the intermittent workability is good.

According to the optical fiber ribbon 1 (2), the coating thickness in the concave portions 18a in the coupling resin 18 is different from the coating thickness in the rest of the parts, and the coupling resin 18 has locations where the coating thickness is small. In the optical fiber ribbon 1 (2), the minimum coating thickness of the coupling resin 18 is 10 μm or less. Accordingly, it is easy to break the coupling resin 18 at the time of manufacturing.

According to the optical fiber ribbon 1(2), the lateral pressure resistance of the optical fibers 11 can be enhanced by using a resin containing the inorganic oxide particles as the secondary resin of the coating layer 16 of the optical fibers 11. Therefore, when the optical fiber ribbon 1 (2) is constituted by such optical fibers 11, an increase in the transmission loss when the optical fiber ribbons 1 (2) are accommodated in an optical fiber cable can be prevented, and thus the optical fiber ribbons 1 (2) can be accommodated in the optical fiber cable at a high density.

In the optical fiber ribbon 1 (2) manufactured by the method for manufacturing an optical fiber ribbon according to the present embodiment, the tip ends of the broken surfaces 13a where the coupling resin 18 is broken are the convex portions 19 having an acute angle in the cross-sectional view in the direction orthogonal to the longitudinal direction. Therefore, according to the method for manufacturing an optical fiber ribbon according to the present embodiment, as described above, it is possible to manufacture the optical fiber ribbon 1 (2) in which the coupling resin 18 can be easily peeled off.

As described above, the optical fiber ribbon 1 (2) manufactured by the above manufacturing method has good fusion workability and splicing errors are less likely to occur.

Figure 8:
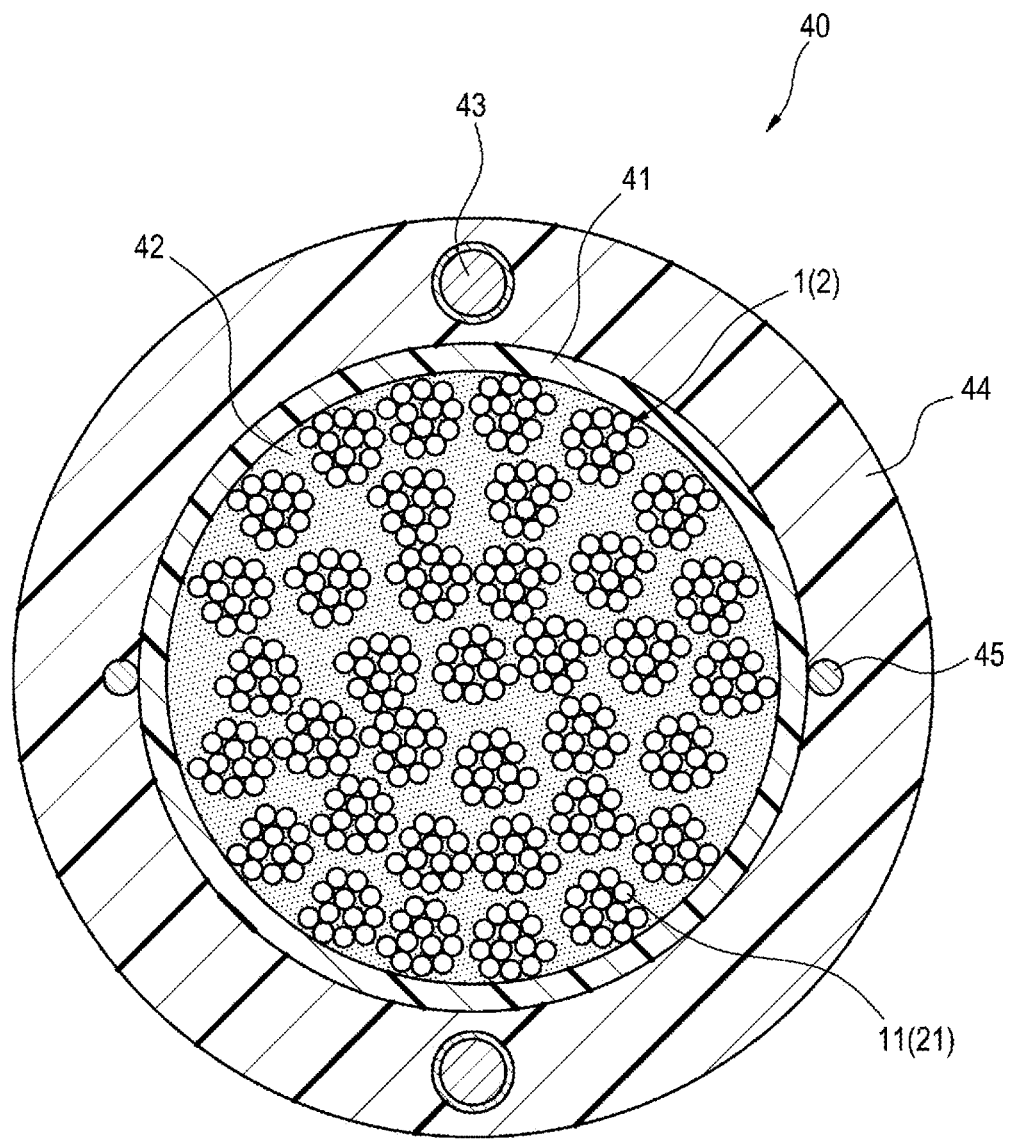
FIG. 8 is a cross-sectional view showing an example of an optical fiber cable according to the present embodiment.
Figure 9:
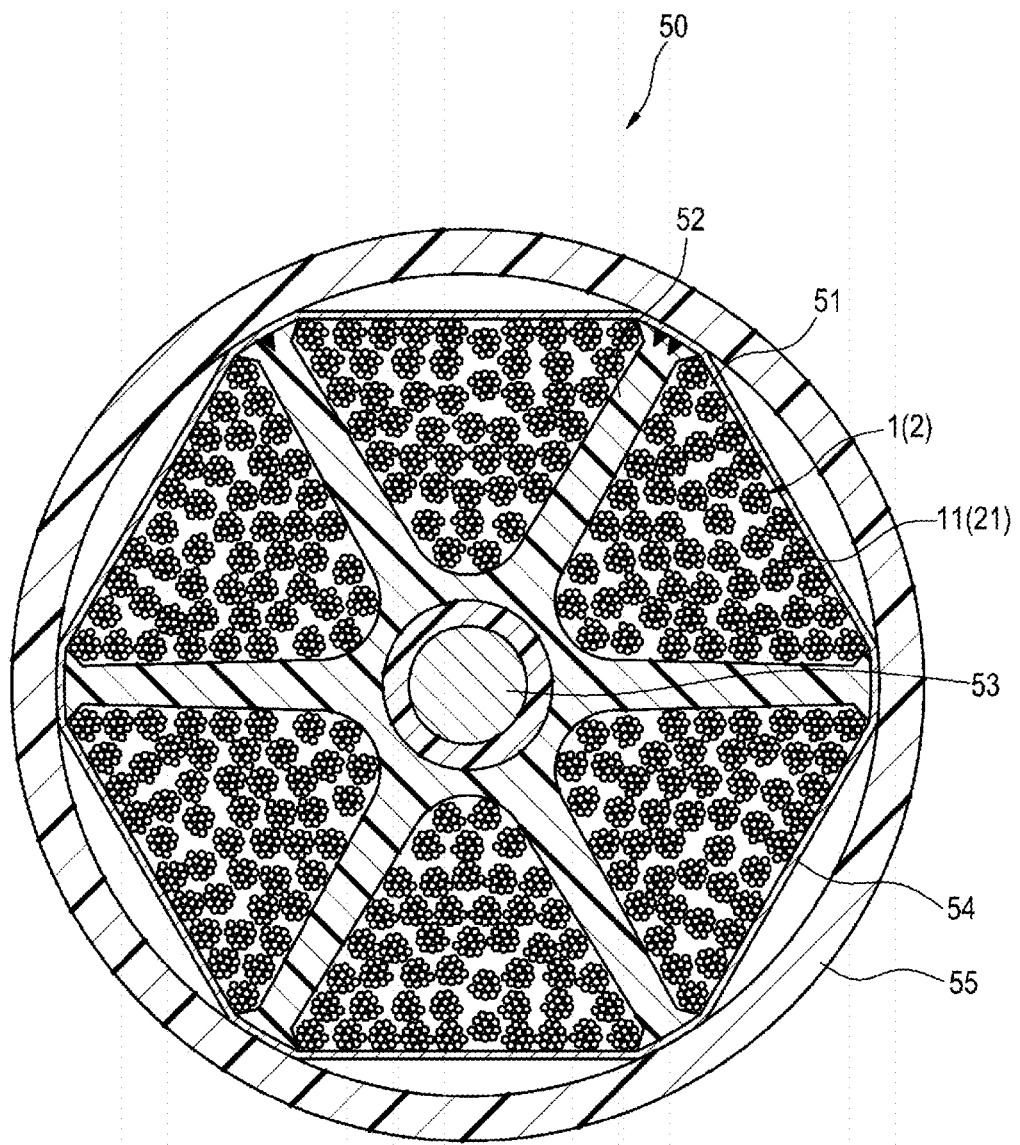
FIG. 9 is a cross-sectional view showing another example of an optical fiber cable.

Next, an optical fiber cable according to the present embodiment will be described with reference to FIGS. 8 and 9. FIG. 8 shows an example of a slotless optical fiber cable using the optical fiber ribbon 1 (2) according to the present embodiment. FIG. 9 shows an example of a slot optical fiber cable using the optical fiber ribbon 1 (2) according to the present embodiment.

A slotless optical fiber cable 40 shown in FIG. 8 includes a cylindrical tube 41 and a plurality of optical fiber ribbons 1 (2) installed in the tube 41. The optical fiber ribbons 1 (2) are gathered to be rounded and are stranded. A plurality of fillers (tensile fibers and the like) 42 are accommodated in the tube 41 to fill gaps between the optical fiber ribbons 1 (2). The circumference of the tube 41 is covered with a sheath 44 together with a tension member 43. A tear string 45 is provided inside the sheath 44.

In the optical fiber cable 40, the optical fibers 11 (21) have a fiber density of 4.5 fibers/mm$^2$ or more per unit area in the cable cross section. The fiber density is calculated by dividing the number of the optical fibers by the cross-sectional area of the optical fiber cable. For example, the slotless optical fiber cable 40 shown in FIG. 8 has 432 fibers. In a case where the outer diameter of the optical fiber cable 40 is 11 mm, the optical fibers 11 (21) can be installed in the optical fiber cable 40 at a fiber density of 4.55 fibers/mm$^2$.

A slot optical fiber cable 50 shown in FIG. 9 includes a slotted rod 52 having a plurality of slot grooves 51, and a plurality of optical fiber ribbons 1 (2) accommodated in the slot grooves 51. The slotted rod 52 has a tension member 53 at the center, and the plurality of slot grooves 51 are radially provided. The optical fiber ribbons 1 (2) are gathered to be rounded, stranded, and accommodated in the slot grooves 51. A wrapping tape 54 is wrapped around the slotted rod 52, and a sheath 55 is formed on the circumference of the wrapping tape 54.

Also in the optical fiber cable 50, the fiber density is 4.5 core/mm$^2$ or more. For example, the slot optical fiber cable 50 shown in FIG. 9 has 3456 fibers. In a case where the outer diameter of the optical fiber cable 50 is 28 mm, the optical fibers 11 (21) can be accommodated in the optical fiber cable 50 at a fiber density of 5.62 fibers/mm$^2$.

The optical fiber cables 40, 50 contain the optical fiber ribbons 1 (2) having the above-described configuration. Therefore, even in a case where the optical fiber ribbons 1 (2) are accommodated at a large fiber density of 4.5 fibers/mm$^2$ or more, the single optical fibers 11(21) can be easily separated without cutting or removing the coupling resin 18 of the coupling portions 12 with a tool or the like when the optical fiber ribbons 1 (2) are taken out from the optical fiber cables 40, 50.

Example

In the intermittently coupled-type optical fiber ribbon according to the present embodiment, intermittent workability and cable loss characteristics were evaluated with a plurality of samples having different Young's modulus and breaking elongation of the coupling resin. The evaluation results are shown in Table 1.

TABLE 1

| Sample No. | Young's Modulus of Coupling Resin (MPa, 23° C.) | Breaking elongation of Coupling Resin (%, 23° C.) | Intermittent Workability | Cable Loss Characteristics (dB/km) |
| --- | --- | --- | --- | --- |
| 1 | 10 | 500 | B | A (0.20) |
| 2 | 50 | 300 | B | A (0.20) |
| 3 | 100 | 150 | A | A (0.20) |
| 4 | 100 | 200 | B | A (0.20) |
| 5 | 500 | 50 | A | A (0.23) |
| 6 | 500 | 150 | A | A (0.24) |
| 7 | 1200 | 30 | A | A (0.28) |
| 8 | 1200 | 50 | A | A (0.28) |
| 9 | 1500 | 50 | A | B (0.31) |

In Table 1, samples No. 1 to 9 are intermittently coupled-type optical fiber ribbons including twelve optical fibers. In the samples No. 1 to 9, an intermittent pattern is formed every other two optical fibers. The intermittent pattern is the same as that of the optical fiber ribbon 1. The Young's modulus and the breaking elongation of the coupling resin are values at room temperature (23° C.).

The intermittent workability was determined by whether the tip ends of the coupling resin 18 in the non-coupling portions 13 could be broken to form the acute convex portions 19 as shown in FIG. 3 when the non-coupling portions 13 were formed in the optical fiber ribbon 1 using the non-coupling portion forming device 30 shown in FIG. 7. A sample whose coupling resin 18 could be broken as the non-coupling portions 13 in FIG. 3 was determined to have good intermittent workability and evaluated as A. A sample whose coupling resin 18 could not be broken in some cases was determined to have intermittent workability inferior to that of Evaluation A and evaluated as B. That is, the sample of Evaluation A includes a coupling resin having good intermittent workability.

The cable loss characteristics were determined based on whether the bending loss satisfies 0.3 dB/km or less at the wavelength of signal light of 1.55 μm when optical fiber ribbons including coupling resins of the above samples were installed in the optical fiber cable 40 shown in FIG. 8. An optical fiber ribbon having a bending loss of 0.3 dB/km or less was determined to have good cable loss characteristics and evaluated as A. An optical fiber ribbon having a bending loss of more than 0.3 dB/km was determined to have poor cable loss characteristics and evaluated as B. That is, the sample of Evaluation A includes a coupling resin having good cable loss characteristics.

The Young's modulus of the coupling resin affects the cable loss characteristics. When the Young's modulus of the coupling resin is increased, for example, when the optical fiber ribbons 1 are gathered to be rounded and accommodated in the optical fiber cable 40, the convex portions 19 of the coupling resin 18 are pressed against the optical fibers 11, and the loss characteristics are deteriorated due to microbending.

The breaking elongation of the coupling resin affects the intermittent workability. When the breaking elongation of the coupling resin is increased, the coupling resin 18 is stretched even when a pressing force is applied from the pressing members 33a to 33e, and thus the coupling resin 18 cannot be broken well.

According to the evaluation results in Table 1, samples having good intermittent workability (samples of Evaluation A) were No. 3 and No. 5 to 9. As a result, it was found that the optical fiber ribbons 1 have good intermittent workability when the breaking elongation of the coupling resin is 150% or less.

Samples having good cable loss characteristics (samples of Evaluation A) were No. 1 to 8. As a result, it was found that the optical fiber ribbons 1 have good cable loss characteristics when the Young's modulus of the coupling resin is 1200 MPa or less.

Samples having both good intermittent workability and good cable loss characteristics were No. 3 and No. 5 to 8. As a result, it was found that the optical fiber ribbons 1 have good intermittent workability and cable loss characteristics when the breaking elongation of the coupling resin is 150% or less and the Young's modulus of the coupling resin is 1200 MPa or less.

Although the present disclosure has been described in detail with reference to a specific embodiment, it will be apparent to those skilled in the art that various changes and modifications can be made without departing from the spirit and scope of the present disclosure. The numbers, positions, shapes and the like of components described above are not limited to the above embodiment and can be changed to suitable numbers, positions, shapes and the like for carrying out the present disclosure.

REFERENCE SIGNS LIST 1, 2: intermittently coupled-type optical fiber ribbon
11 (11A to 11L): optical fiber
12: coupling portion
13: non-coupling portion
13a: broken surface
14: glass fiber
15: inner coating layer
16: outer coating layer
17: colored layer
18: coupling resin
18a: concave portion
19: convex portion
21 (21A to 21L): optical fiber
22: coupling portion
23: non-coupling portion
30: non-coupling portion forming device
31a to 31e: breaking mechanism
33a to 33e: pressing member
40, 50: optical fiber cable
B1, B2: coating thickness

The invention claimed is:

1. An intermittently coupled-type optical fiber ribbon in which, in a state where a plurality of optical fibers are arranged in parallel, coupling portions at which adjacent optical fibers are coupled by a coupling resin and non-coupling portions at which the adjacent optical fibers are not coupled are intermittently provided in a longitudinal direction, the coupling portions and the non-coupling portions being provided between some or all of the plurality of optical fibers,
    wherein at least some of the non-coupling portions include a convex portion of the coupling resin, a tip end of the convex portion having an acute angle in a cross-sectional view in a direction orthogonal to the longitudinal direction.

2. The intermittently coupled-type optical fiber ribbon according to claim 1,
    wherein an outer diameter of the optical fiber is 160 μm or more and 220 μm or less.

3. The intermittently coupled-type optical fiber ribbon according to claim 1,
    wherein the optical fiber includes a glass fiber, a coating layer covering a circumference of the glass fiber, and a colored layer covering a circumference of the coating layer, and
    wherein, at least at a part of the non-coupling portion, the colored layer is exposed.

4. The intermittently coupled-type optical fiber ribbon according to claim 1,
    wherein a Young's modulus of the coupling resin is 1200 MPa or less at 23° C.

5. The intermittently coupled-type optical fiber ribbon according to claim 1,
    wherein a breaking elongation of the coupling resin is 150% or less at 23° C.

6. The intermittently coupled-type optical fiber ribbon according to claim 1,
    wherein a minimum coating thickness from a surface of the coupling resin to a surface of the optical fiber is 10 μm or less.

7. The intermittently coupled-type optical fiber ribbon according to claim 1,
    herein the optical fiber includes two coating layers,
    wherein an outer coating layer of the two coating layers is a cured product of a resin composition containing:

a base resin containing a urethane acrylate oligomer or a urethane methacrylate oligomer, a monomer having a phenoxy group, a photopolymerization initiator, and a silane coupling agent; and hydrophobic inorganic oxide particles, and wherein a content of the inorganic oxide particles in the resin composition is 1% by mass or more and 45% by mass or less based on a total amount of the resin composition.

8. An optical fiber cable in which the intermittently coupled-type optical fiber ribbon according to claim 1 is installed, and wherein a fiber density of the optical fiber cable obtained by dividing the number of optical fibers by a cable cross-sectional area is 4.5 fibers/mm$^2$ or more.

9. A method for manufacturing an intermittently coupled-type optical fiber ribbon in which, in a state where a plurality of optical fibers are arranged in parallel, coupling portions at which adjacent optical fibers are coupled by a coupling resin and non-coupling portion at which the adjacent optical fibers are not coupled are intermittently provided in a longitudinal direction, the coupling portions and the non-coupling portions being provided between some or all of the plurality of optical fibers, the method comprising:

forming the coupling portions by coating the plurality of optical fibers arranged in parallel with the coupling resin; and forming the non-coupling portions by intermittently, in a longitudinal direction, pressing the coupling resin between the optical fibers with a pressing member having a sharp tip end so as to break at least a part of the coupling resin in such a way that a tip end of a broken surface where the coupling resin is broken becomes a convex portion having an acute angle in a cross-sectional view in a direction orthogonal to the longitudinal direction.

* * * * *